(12) United States Patent
McVaugh

(10) Patent No.: US 6,536,709 B1
(45) Date of Patent: Mar. 25, 2003

(54) SMALL AIRCRAFT POWER TUG

(76) Inventor: Arthur K. McVaugh, Box 800, Green Lane, PA (US) 18054

( * ) Notice: Subject to any disclaimer, the term of this patent is extended or adjusted under 35 U.S.C. 154(b) by 0 days.

(21) Appl. No.: 10/034,314

(22) Filed: Dec. 26, 2001

(51) Int. Cl.[7] .................................................. B64F 1/10

(52) U.S. Cl. ................... 244/114 R; 180/904; 180/19.1

(58) Field of Search ....................... 244/50, 51, 114 R, 244/115; 180/19.1, 19.2, 19.3, 11, 12, 904

(56) References Cited

U.S. PATENT DOCUMENTS

| | | | | |
|---|---|---|---|---|
| 2,920,845 A | * | 1/1960 | Palmiter | 180/19.3 |
| 4,280,578 A | * | 7/1981 | Perkins | 180/6.5 |
| 4,915,185 A | * | 4/1990 | Olson | 180/19.2 |
| 5,893,230 A | * | 4/1999 | Koltoniak | 43/3 |

FOREIGN PATENT DOCUMENTS

| | | | | |
|---|---|---|---|---|
| GB | 2193935 A | * | 2/1988 | ........... B62D/51/04 |

* cited by examiner

*Primary Examiner*—Peter M. Poon
*Assistant Examiner*—Timothy D Collins
(74) *Attorney, Agent, or Firm*—John S Munday

(57) ABSTRACT

A tug device for moving small aircraft having front wheels. A portable drill is connected to a drive wheel and a frame is removeably attached to the wheel. The frame has a generally u-shaped configuration with a fixed position trunion on one end for engagement with an aircraft. A rotating member is mounted on the frame with an engaging trunion for aircraft engagement. A control member moves the engaging trunion into engagement with the aircraft. Dolly wheels are used for freely moving the tug. A connector connects the frame and power column to position the trunions to engage an aircraft in at least one position. Preferred is to have the connector connect the frame and power column in a first position to engage the front axle of an aircraft and a second position to engage the front wheel strut of an aircraft.

20 Claims, 11 Drawing Sheets

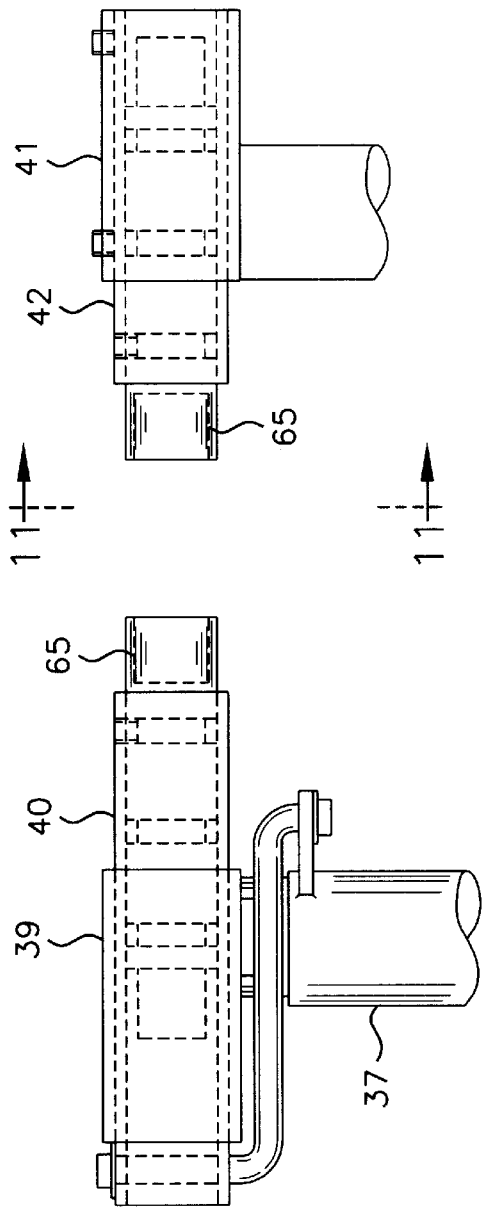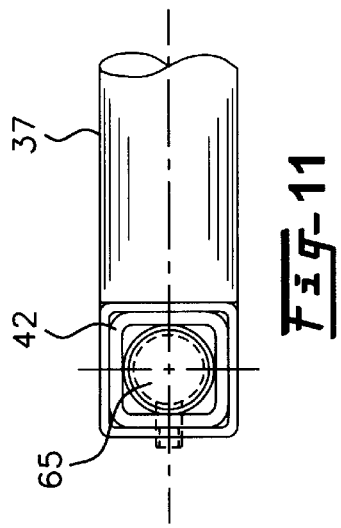
Fig-10
Fig-11

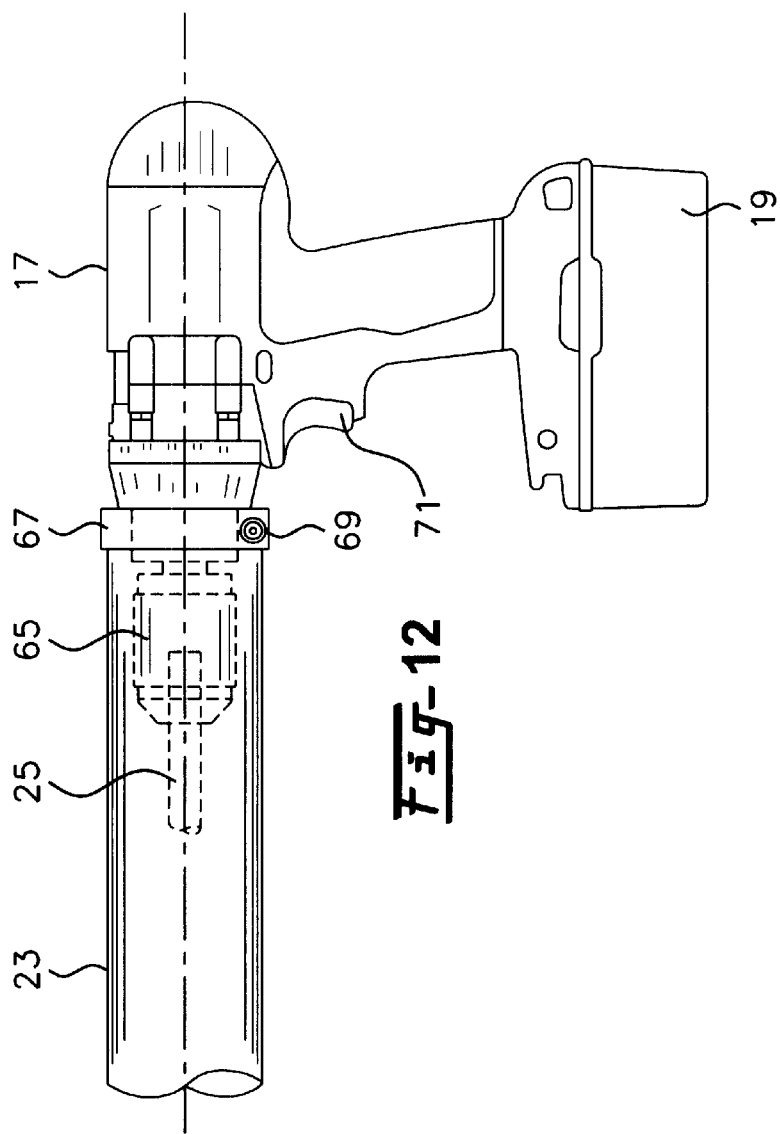
_Fig-12_
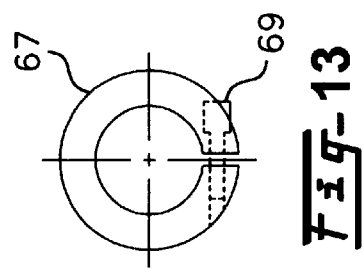
_Fig-13_

SMALL AIRCRAFT POWER TUG

FIELD OF THE INVENTION

The present invention relates to a power tug for moving small aircraft at airports and the like. More particularly the present invention relates to a power tug using a commercially available portable electric drill to drive a gear and wheel assembly capable of rapid attachment to small aircraft front wheel axles and nose struts.

BACKGROUND OF THE INVENTION

Moving small aircraft on the ground is often necessary when the aircraft is serviced or taken to a hanger or brought out. In the past, the motor has been started and the aircraft's own power has moved it from one place to another. This, of course, presents a potential danger from the rotating propeller. It also produces unnecessary wear and stress on the motor when it is operated for just a short while.

As an alternative, aircraft tugs have been employed, much like the large tugs that move commercial jet aircraft and the like. However, this requires a significant investment in equipment costs for operating the tug. It also requires having someone available to operate the device and/or train small aircraft owners to use the machine.

It would be of great advantage if a simple, efficient device could be developed that would permit owners to move their own planes without worrying about safety concerns from the motor of the plane.

One such device has been proposed. Olson U.S. Pat. No. 4,915,185 discloses a portable aircraft moving device using a portable electric drill. The drill output shaft is linked to a worm gear to mount temporarily to the front wheel of the airplane above the airplane wheel. While the drawings of this patent are clearly not intended to be to scale, the size of the airplane and the operator distort the difficulties of moving aircraft that may weigh several thousand pounds. Olson requires a drive wheel in the device to engage the aircraft front wheel and use that wheel to push or pull the aircraft One additional drawback of Olson is that it places frictional stress on the nose wheel. It is not adaptable to all aircraft, requiring a specific axle adapter for each make or model.

Other patents have also found use for portable electric drills. Hawgood U.S. Pat. No. 4,156,315 discloses a dolly for maneuvering trailers, again using a worm gear.

Perkins U.S. Pat. No. 4,280,578 teaches the use of an electric drill for a walker for the disabled, a far less substantial weight and effort than aircraft Perkins also uses a worm gear arrangement Finally, Hurt U.S. Pat. No. 3,713,501 employs an electric drill to alternatively move a belt to elevate the hand truck up or down stairs or move the wheel axle of the hand truck on flat ground. None of these other devices suggest a simple, effective method for moving small aircraft without frictional engagement with the nose wheel of the aircraft and without having separate fittings for each make or model of the plane being moved.

Accordingly, it is an object of the present invention to provide an improved tug for moving small aircraft on the ground.

A further object of this invention is to provide a tug that engages virtually all makes and models of such small aircraft with minimum alteration of the tug.

Another object of this invention is to provide a positive drive for a tug, so that the aircraft is stable on grade.

Other objects will appear hereinafter.

SUMMARY OF THE INVENTION

It has now been discovered that the above and other objects of the present invention may be accomplished in the following manner. Specifically, the present invention provides a tug for moving small aircraft, usually single engine, on the ground while the motor of the airplane is off.

The tug device includes two parts that are fastened together prior to use, in one or more orientations depending on the specific aircraft being taxied. One component comprises a power transmission column having a battery powered drill having a variable output, mounted on the upper end of the column and a drive wheel at the other end. A drive shaft engages the drill and a speed reducing gear box to drive the unit. The unit is steered by movement of a handle on the column.

The second component comprises a frame having a first and second end defining a generally u-shape configuration. A fixed position trunion mounted on the first end of the frame for engagement with an aircraft. A rotating engaging member is mounted on the other end of the frame, the engaging member having an engaging trunion for engagement with an aircraft. A control member is provided for moving the engaging trunion into and out of engagement with the aircraft. Dolly wheels are on the frame for free wheeling the unit.

The unit is assembled using a connector mount for connecting the frame to the power column to position the fixed position trunion and engaging trunion in position to engage an aircraft in at least one position. In the preferred embodiment, there are two positions so that the tug can work on open front or nose wheels and a second position for engagement with the wheel strut when the wheel is covered, such as with a faring.

BRIEF DESCRIPTION OF THE DRAWINGS

For a more complete understanding of the invention, reference is hereby made to the drawings, in which:

FIG. 10 is a top view showing the trunions in position to engage an aircraft wheel;

FIG. 11 is an end view of the device on the right of FIG. 10;

FIG. 12 is a side elevational view of the power element of the present invention; and FIG. 13 is a front view of the device shown in FIG. 12.

DETAILED DESCRIPTION OF THE PREFERRED EMBODIMENT

Figure 1:
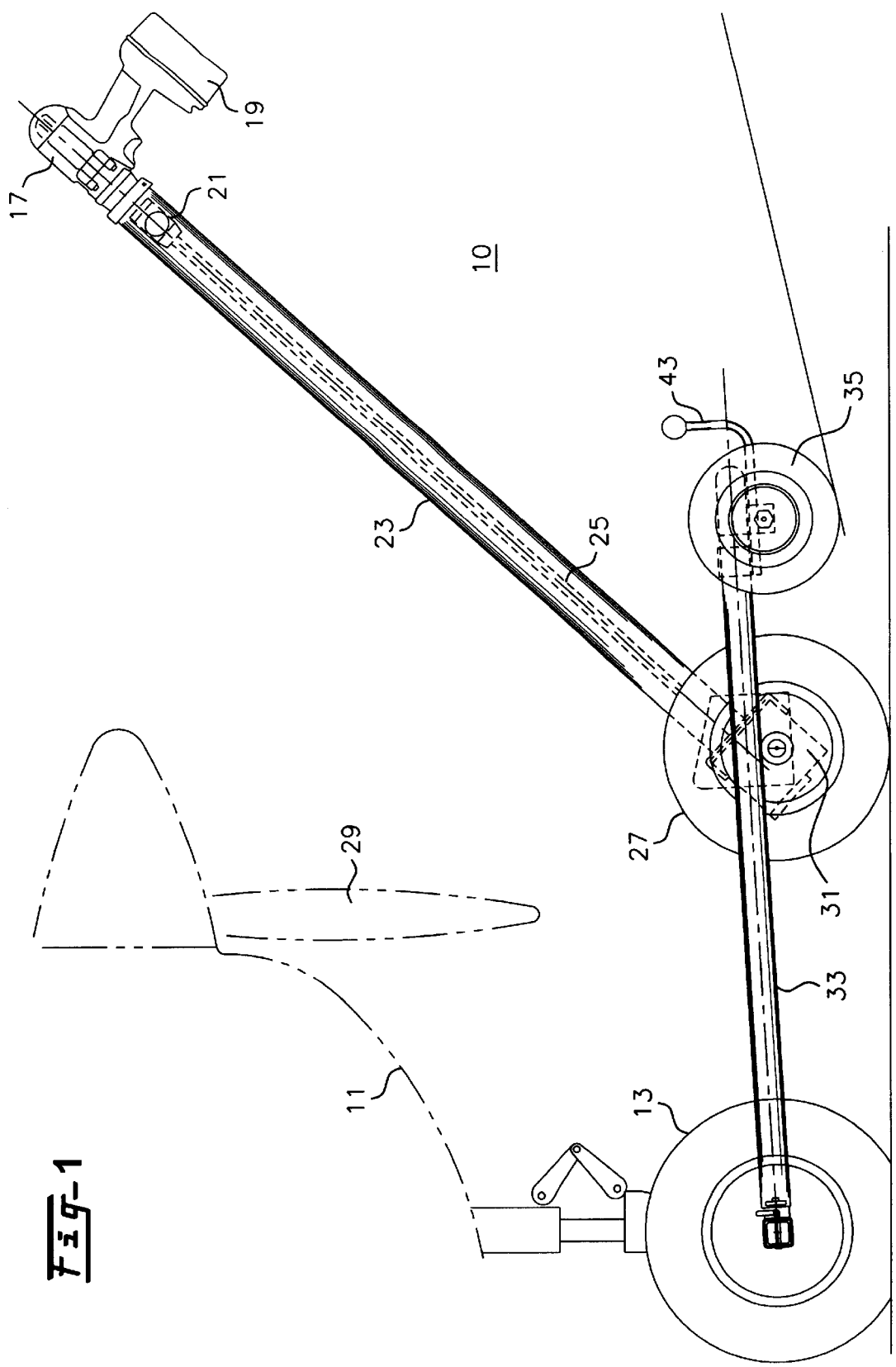
FIG. 1 is a side elevational view, partially cut away, showing the preferred embodiment in use with an aircraft shown in dot and dash lines.
Figure 2:
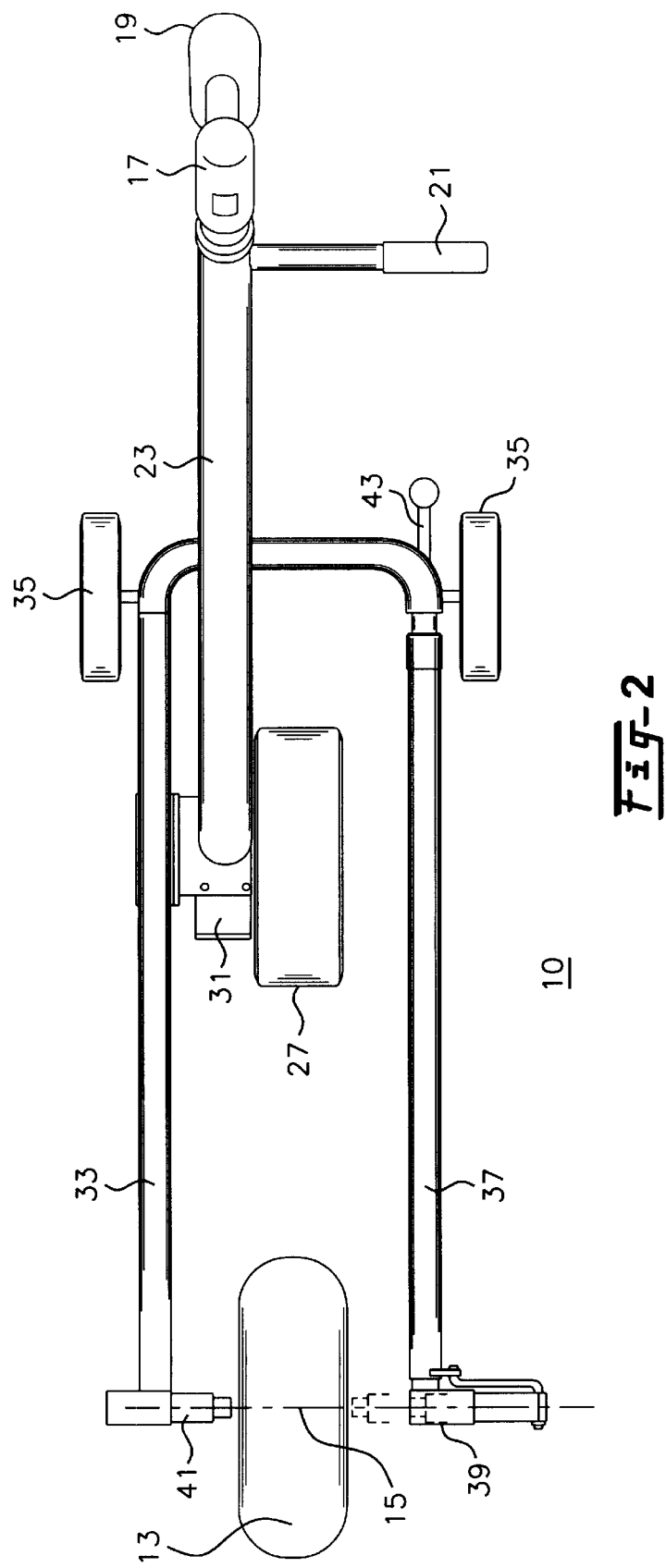
FIG. 2 is a top view of the device of FIG. 1.

As shown in the drawings, particularly FIGS. 1 and 2, the present invention provides a device 10 generally for use with an airplane 11 having a front wheel 13 supported on a front axle 15. Aircraft of any make or model weight less than about 3,000 pounds are suitable for use with the power tug of this invention. The tug includes a battery powered conventional electric drill 17, with rechargeable battery 19, for providing a suitable variable speed power source.

The preferred electric drill is a cordless 18-volt battery operated drill, having a quick release battery that snaps in place. A spare battery can be carried on the device.

The device includes a handle 19 for directional control of the device which is attached to the tubular power column 23. Column 23 includes a drive shaft 25, shown in dashed lines in FIG. 1, which communicates with drive wheel 27 to allow the device to be positioned near airplane 11 while propeller 29 is not operating, allowing a safe movement of plane 11, drive wheel is operated by drive shaft 25 and worm gear speed reducer 31, allowing drive wheel 27 to rotate in either direction, to push or pull aircraft 11.

A tubular frame 33 is attached to the drive shaft 25 and drive wheel 27 via simple connecting point, described below, which permits the unit to be separated into two major parts or components. Tubular frame 33 supports dolly wheels 35, which permit free wheeling movement of the unit when it is not attached to an aircraft.

Tubular frame 33 also includes a rotating engaging tube 37 for locking the tug to the airplane. Engaging tube 37 includes an engaging trunion 39 which is used to engage the aircraft axle 15 after fixed position trunion 41 has engaged the other side of axle 15. An aircraft engaging control lever 43 is foot operated to pivot engaging trunion 39 on to axle 15.

Figure 3:
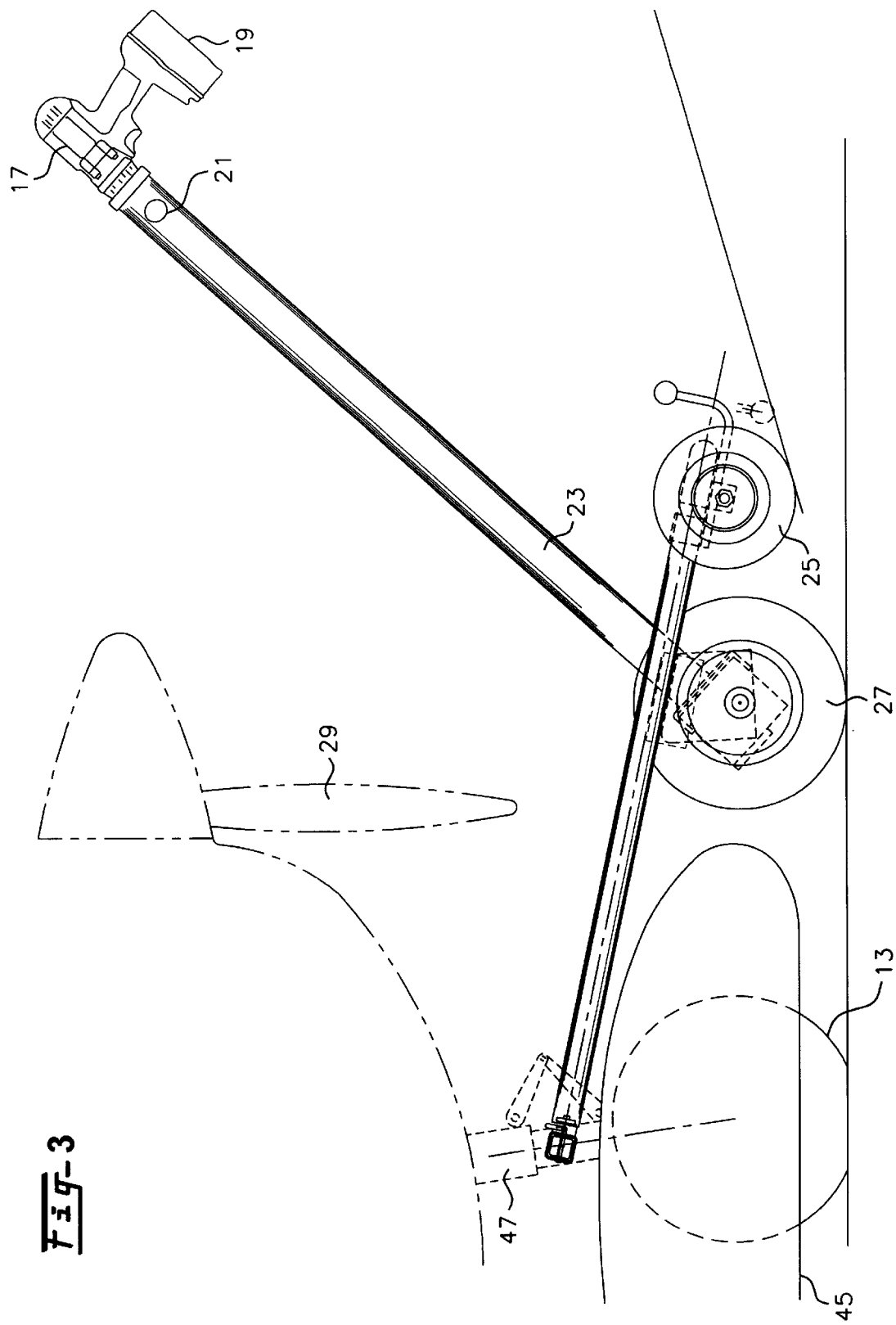
FIG. 3 is a side elevational view of the device of FIG. 1, in use with an alternative type of aircraft wheel.
Figure 4:
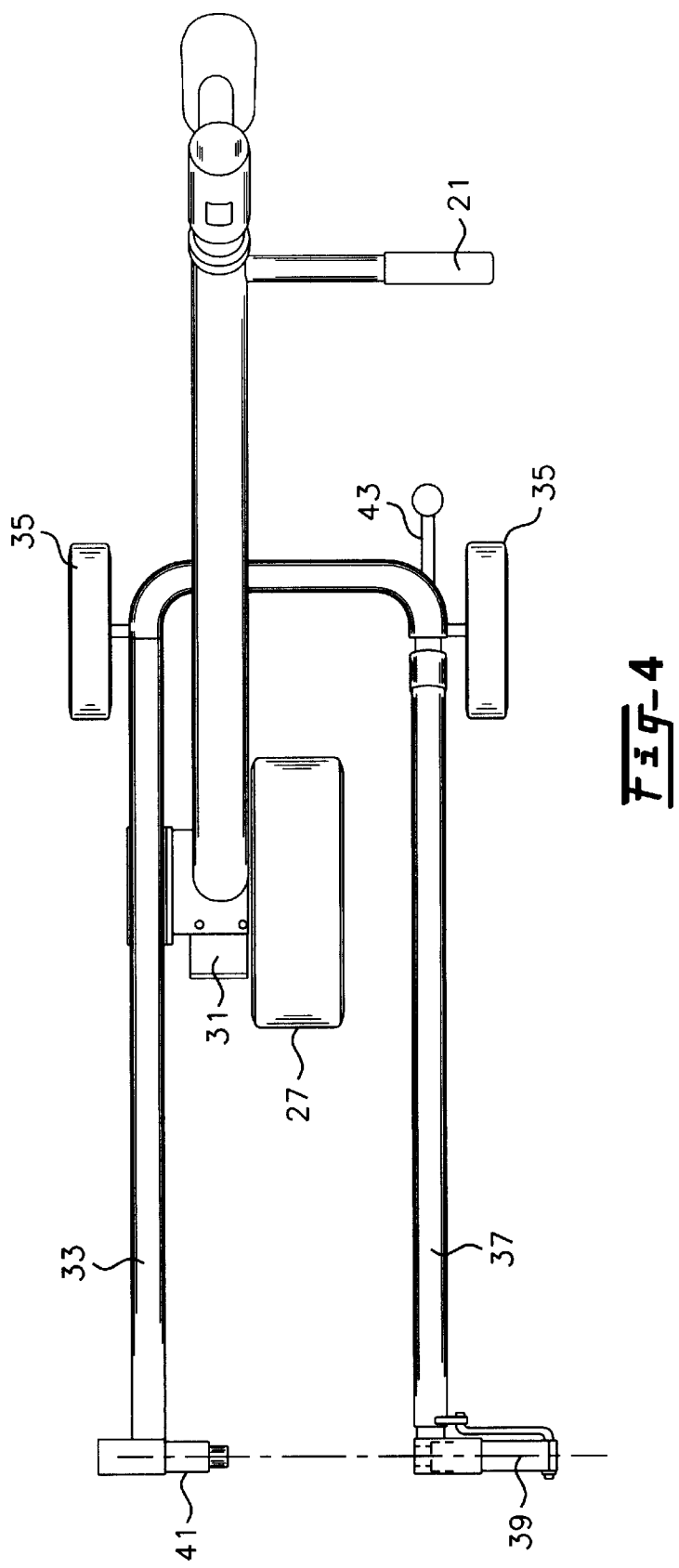
FIG. 4 is a top view of the device of FIG. 3.

FIGS. 3 and 4 illustrate an alternative use of the present invention with aircraft having enclosed front wheels 45 so that the engageable trunion 39 and fixed trunion 41 engage the airplane nose gear strut 47, tubular frame 33 is attached to the power column 23 and drive wheel 27 at a different angle or position, shown in FIG. 3.

Figure 5:
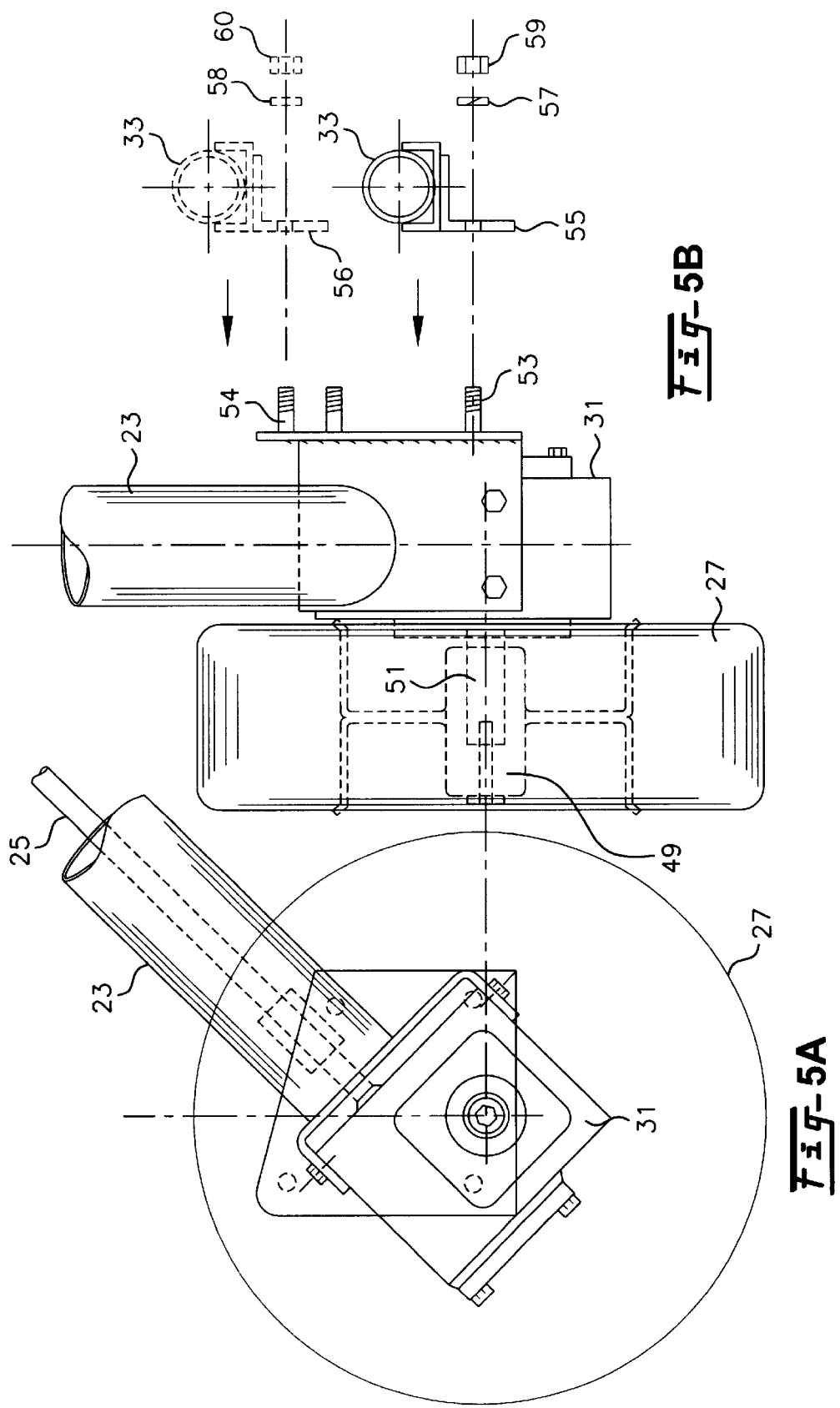
FIGS. 5A and 5B are detail views of the method of attachment of the frame to the power column in two configurations.
Figure 6:
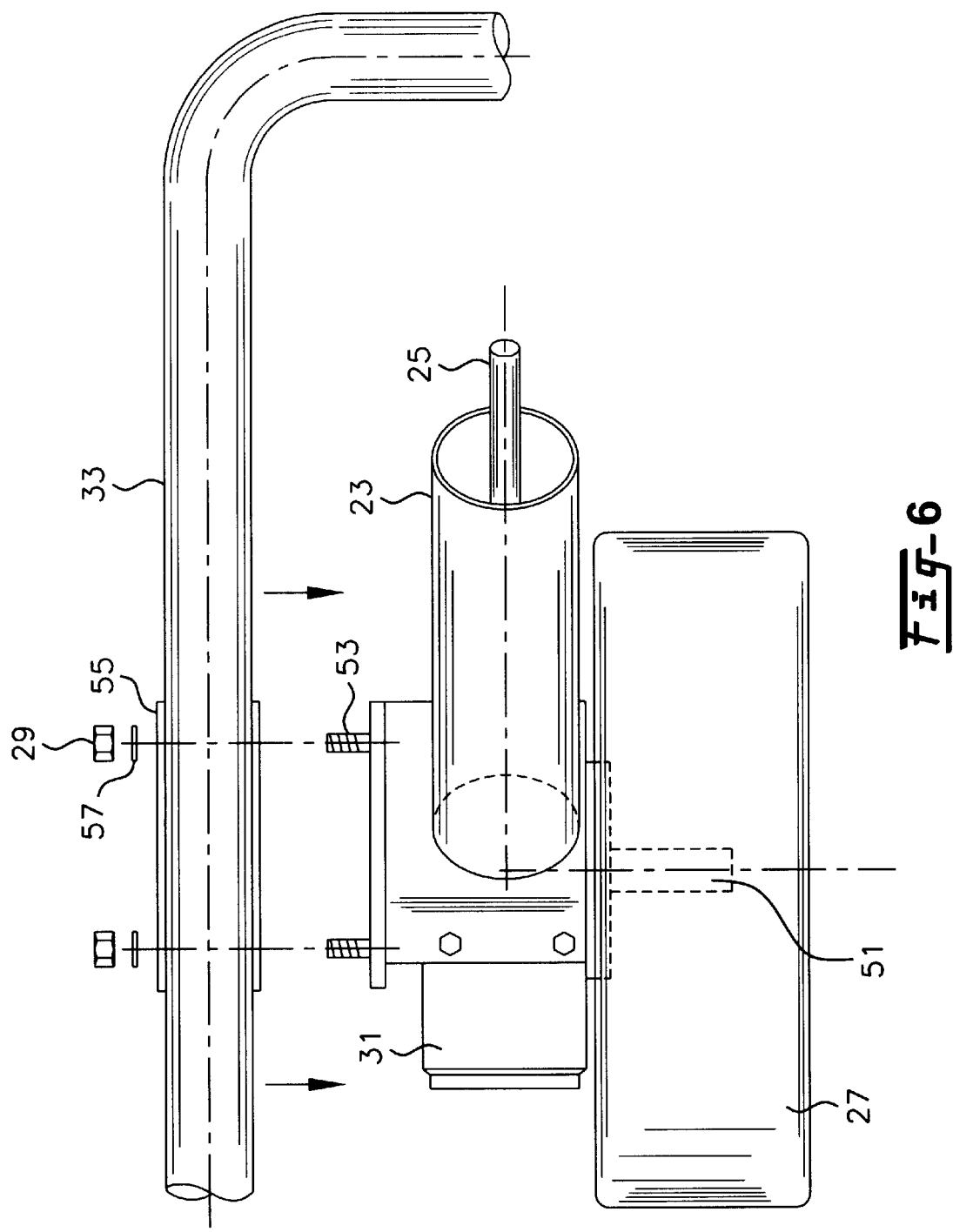
FIG. 6 is detail view illustrating the attachment of the frame to the power column in one configuration.

Frame 33 and power column 23 are joined using the attachment means shown in FIGS. 5A, 5B and FIG. 6. FIG. 5A is a side view of the power column 23 and worm gear box 31, also showing drive shaft 25. In FIG. 5B, drive wheel 27 includes a wheel to shaft attaching hub 49 and driven shaft 51. Worm gear box 31 is mounted on driven shaft 51, and the gear box 31 also includes bolts 53 for bracket 55 for attachment in the orientation shown in FIGS. 1 and 2, using lock washers 57 and hex nuts 59. Alternatively, shown in dot and dash line in FIG. 5B, bolts 54 are used with bracket 56, lock washer 58 and hex nut 60 for attachment in the orientation shown in FIGS. 3 and 4.

Figure 7:
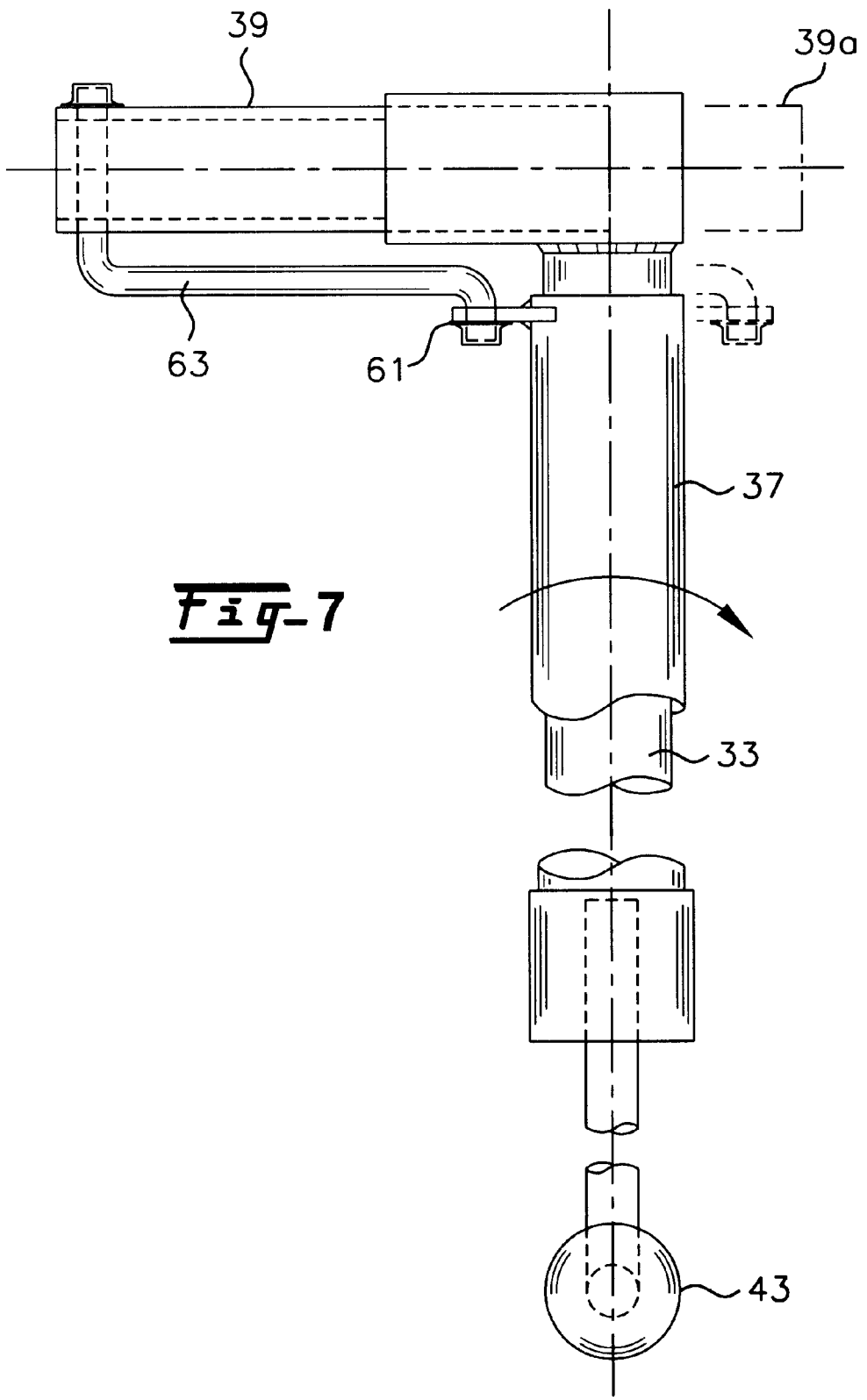
FIG. 7 is a detail view of the operation of the engagement trunion of the invention, with some components illustrated in dot and dash lines.
Figure 8:
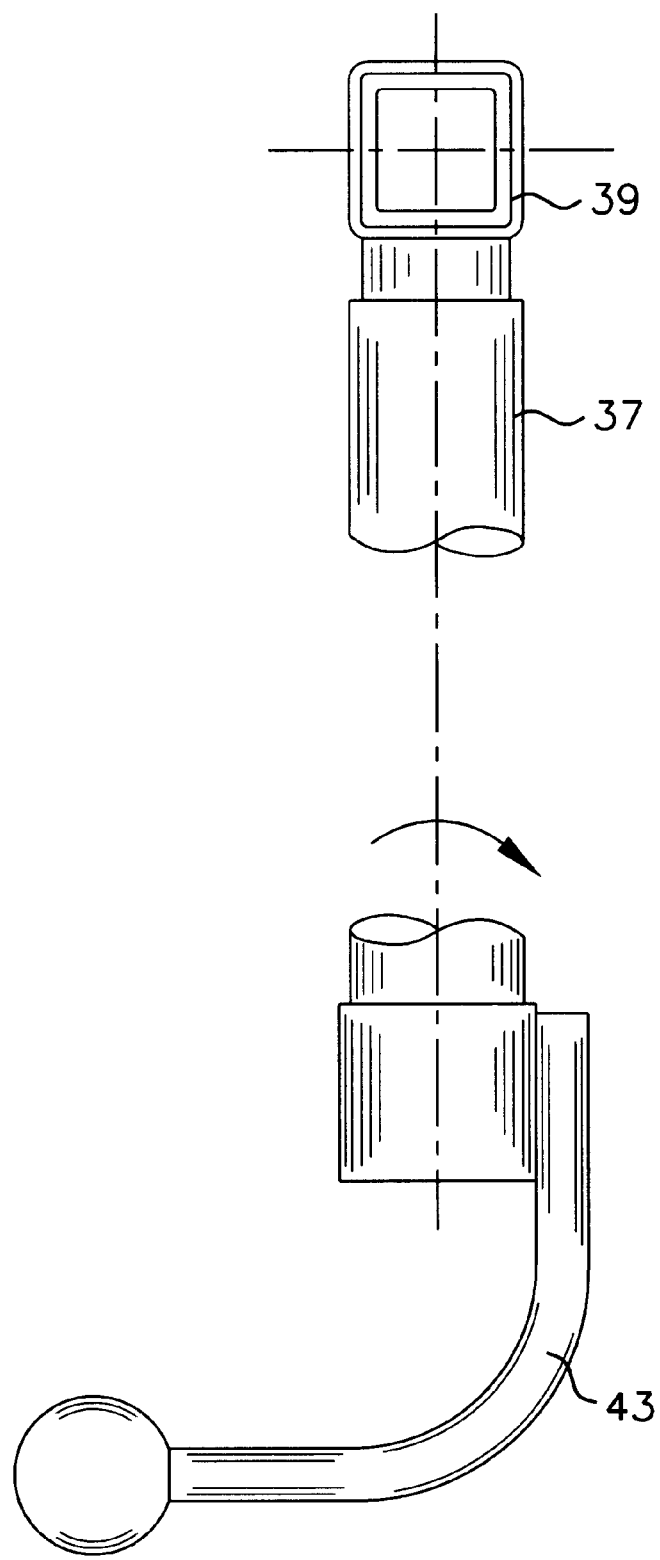
FIG. 8 is a detail view of the locking engagement mechanism for the engaging trunion.
Figure 9:
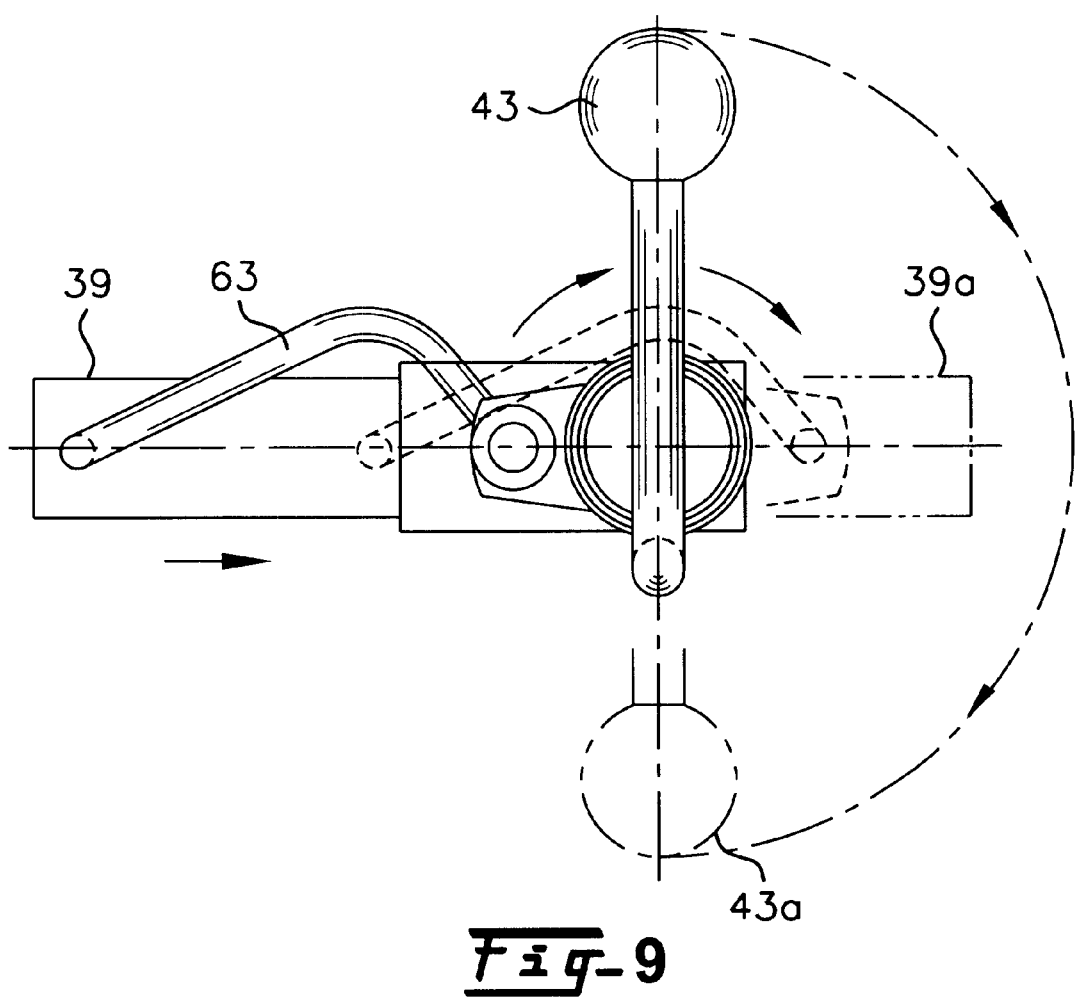
FIG. 9 is a side view illustrating the device shown in FIG. 8.

FIGS. 7, 8 and 9 illustrate the preferred engagement mechanism for attachment to the axle 15 or aircraft strut 47, depending on the particular airplane being towed by the tug device of this invention. Stationary tube 33 is enclosed by rotating engaging tube 37, shown in FIG. 7 as both are partially cut away. Engaging tube 37 includes a bracket 61 for holding link 63, which moves engaging trunion 39 about the axis of rotating engaging tube 37 for engagement with the axle 15 or strut 47 as described below.

FIG. 8 illustrates the way aircraft engaging control lever 43 is rotated to cause trunion 39 to be pivoted about that axis. FIG. 9 illustrates the control lever 43 in the engaged position, so that trunion 39 is, for example, engaged with axle 15, not shown in this figure. Movement of control lever 43a to the position shown in dot and dash lines moves link 63, and therefore trunion 39 away from the axle to the position shown, also seen as dot and dash lines in FIG. 7. The arrows illustrate the direction of movement of the components shown in these figures. Engagement is easy and secure, and an operator can use his or her foot to move control lever between the two positions.

FIG. 10 illustrates sliding engaging trunion 39 in greater detail and shows additional details of fixed position trunion 41, both of which are shown as square tubular stock 40 and 42 respectively. Adapters 65 are fitted on tubular stock 40 and 42. The airplane is then put in position, such as that of FIGS. 1 and 2, for example, so that axle 15 is first engaged by adapter 65 on stock 42, so that when sliding engaging trunion 39 is moved as described above, adapter 65 on tubular stock 40 also engages axle 15. FIG. 11 illustrates one end of adapter 65 mounted on stock 42, taken along lines 11—11 of FIG. 10. The unit is ready to move the aircraft.

FIGS. 12 and 13 illustrate the attachment and/or removal and replacement of cordless electric drill 17, if, for example, drill 17 should fail. In most commercially available drills, such as the ones shown here, battery 19 can be removed for recharging and, if desired, a spare battery could be used while charging the first such battery. Drill 17 includes a drill chuck 65 which engages drive shaft 25, shown in dot and dash line in FIG. 12. A split collar 67 is welded to tubular power column 23 and fitted with a clamping screw 69 to mount the drill 17 firmly to the column 23. Pressure on trigger 71 causes shaft 25 to rotate in either direction, depending on the rotation direction selected on drill 17, so that shaft 25 rotates to drive wheel 27 through a conventional worm gear speed reducer 31, seen in FIG. 1, for example.

Once the wheel 13 of an aircraft has been engaged, drill 17 moves drive wheel as desired, as fast or as slow as necessary, so that the aircraft can be brought to or from its parking location, or maintenance hanger. Handle 21 allows the device to be steered, providing excellent maneuverability.

The tug device of the present invention has been tested on a number of small aircraft. Tests have shown that the tug device is capable of moving a 3,000 pound airplane in and out of hangers with no strain or noticeable effort. One fully charged battery will continuously move an aircraft for at least ⅛ mile at two feet per second. There is no need to bend or stoop, since the control lever 43 is foot controlled, snapping from an engaged position to a disengaged position and back.

Since different airplane manufactures have different front wheel designs, the trunions are easily changed as desired in minutes. The cordless driver is intended to be a name brand drill that can be serviced at thousands of tool service centers, and can be removed and replaced in seconds. Since the drive wheel 27 is engaged with the gear box and drive shaft at all times, the drill acts as a positive brake for safe control on grades. Because there is full time engagement on the nose strut of the airplane, either on the nose wheel or the strut itself, there is no loss of control of the aircraft while in motion. The ability to attach and detach the frame to the power column allows for easier storage and for positioning the trunions for the two common forms of front airplane wheel assemblies gives the tug of this invention universal applicability.

While particular embodiments of the present invention have been illustrated and described, it is not intended to limit the invention, except as defined by the following claims.

What is claimed is:

1. A tug device for moving small aircraft having front wheels, comprising:
   a power transmission column having an upper and lower end, said column further having a handle for directional control;
   a battery powered drill having a variable output, said drill being mounted on said upper end of said column;
   a drive wheel mounted on said lower end of said column, said drive wheel having a speed reducing gear box attached to said wheel to drive said wheel;
   a drive shaft mounted in said column and attached at one end to said drill and at the other end to said gear box, whereby rotation of said drill rotates said shaft to cause said drive wheel to move;
   a frame having a first and second end defining a generally u-shape configuration, said frame having a fixed position trunion mounted on said first end for engagement with an aircraft;
   a sliding engaging member mounted on said second end of said frame, said engaging member having an engaging trunion for engagement with an aircraft, said sliding engaging member having a control member for moving said engaging trunion into and out of engagement with said aircraft;
   dolly wheels on said frame for free wheeling said frame; and
   a connector mount for connecting said frame to said power column to position said fixed position trunion and engaging trunion in position to engage an aircraft in at least one position.

2. The device of claim 1, wherein said fixed position trunion and engaging trunion are sized to engage an axle of the front wheel of an aircraft.

3. The device of claim 1, wherein said fixed position trunion and engaging trunion are sized to engage the front wheel strut of an aircraft.

4. The device of claim 1, wherein said connector mount connects said frame to said power column in a first position to permit said fixed position trunion and engaging trunion to engage the front wheel of an aircraft and a second position to permit said fixed position trunion and engaging trunion to engage the front wheel strut of an aircraft.

5. The device of claim 1, wherein said control member is positioned to be operated by the foot of a user.

6. The device of claim 1, wherein said fixed position trunion and said engaging trunion are adapted to have changeable heads for engagement with different aircraft.

7. The device of claim 1, wherein said dolly wheels are elevated from the ground when said tug is in engagement with an aircraft.

8. The device of claim 7, wherein said dolly wheels are positioned to engage the ground and pivot said drive wheel off the ground.

9. The device of claim 1, wherein said sliding engaging member is movable and said engaging trunion is mounted on said sliding engaging member, whereby movement of said sliding engaging member places said engaging trunion in an engaged or non engaged position, said engaging position being past the center between said positions.

10. A tug device for moving small aircraft having front wheels, comprising:
    power transmission column means for transmitting power and having an upper and lower end, said column means further having handle means for directional control of said column;
    battery powered drill means for powering said tug and having a variable output, said drill means being mounted on said upper end of said column means;
    drive wheel means for driving said tug and being mounted on said lower end of said column means, said drive wheel means having a speed reducing gear box means for transmitting power to said drive wheel means, said gear box means being attached to said wheel means to drive said wheel means;
    drive shaft means for transmitting rotational motion from said drill means to said gear box means, said drive shaft means being mounted in the said column means and attached at one end to said drill means and at the other end to said gear box means, whereby rotation of said drill means rotates said shaft means to cause said drive wheel means to move;
    frame means for attaching to an aircraft and having a first and second end defining a generally u-shape configuration, said frame means having a fixed position trunion means mounted on said first end for engagement with an aircraft;
    sliding engaging means mounted on said second end of said frame means, said engaging means having engaging trunion means for engagement with an aircraft, said engaging means having control member means for moving said engaging trunion means into and out of engagement with said aircraft;
    dolly wheel means on said frame for free wheeling said frame; and
    connector means for connecting said frame means to said power column means to position said fixed position trunion means and engaging trunion means in position to engage an aircraft in at least one position.

11. The device of claim 10, wherein said fixed position trunion means and engaging trunion means are sized to engage an axle of the front wheel of an aircraft.

12. The device of claim 10, wherein said fixed position trunion means and engaging trunion means are sized to engage a front wheel strut of an aircraft.

13. The device of claim 10, wherein said connector means connects said frame means to said power column means in a first position to permit said fixed position trunion means and engaging trunion means to engage a front wheel of an aircraft and a second position to permit said fixed position trunion means and engaging trunion means to engage a front wheel strut of an aircraft.

14. The device of claim 10, wherein said control means is positioned to be operated by the foot of a user.

15. The device of claim 10, wherein said fixed position trunion means and said engaging trunion means are adapted to have changeable heads for engagement with different aircraft.

16. The device of claim 10, wherein said dolly wheel means are elevated from the ground when said tug is in engagement with an aircraft.

17. The device of claim 16, wherein said dolly wheel means are positioned to engage the ground and pivot said drive wheel off the ground.

18. The device of claim 10, wherein said sliding engaging means is movable and said engaging trunion means is mounted on said sliding engaging means, whereby movement of said sliding engaging means places said engaging trunion means in an engaged or non engaged position, said engaging position being past the center between said positions.

19. A tug device for moving small aircraft having front wheels, comprising:
- a power transmission column having an upper and lower end, said column further having a handle for directional control of said column;
- a battery powered drill having a variable output, said drill being mounted on said upper end of said column;
- a drive Wheel mounted on said lower end of said column, said drive wheel having a speed reducing gear box attached to said wheel to drive said wheel;
- a drive shaft mounted in said column and attached at one end to said drill and at the other end to said gear box, whereby rotation of said drill rotates said shaft to cause said drive wheel to move;
- a frame attached to said power transmission column and having a first and second end defining a generally u-shape configuration, said frame having a fixed position trunion mounted on said first end for engagement with an aircraft;
- a rotating engaging member mounted on said second end of said frame, said engaging member having an, engaging trunion for engagement with an aircraft, said rotating engaging member having a control member for moving said engaging trunion into and out of engagement with said aircraft; and
- wheels on said frame for free wheeling said frame.

20. The device of claim 19, wherein said frame is mounted on said power column in a first position to permit said fixed position trunion and engaging trunion to engage the front wheel of an aircraft and a second position to permit said fixed position trunion and engaging trunion to engage the front wheel strut of an aircraft.

* * * * *